United States Patent [19]

Modica

[11] 4,367,454
[45] Jan. 4, 1983

[54] THEFT DETERRING APPARATUS

[76] Inventor: Frank Modica, 1123 W. Webster Ave., Chicago, Ill. 60614

[21] Appl. No.: 350,320

[22] Filed: Feb. 19, 1982

[51] Int. Cl.³ .............................................. B60J 7/10
[52] U.S. Cl. ..................................... 340/63; 180/286; 292/150; 296/218
[58] Field of Search ................... 340/63; 70/241, 264; 180/286; 292/150; 296/218, 224

[56] References Cited

U.S. PATENT DOCUMENTS

| 2,834,420 | 5/1958 | Guess | 70/264 |
| 3,603,636 | 9/1971 | Carella | 296/218 |
| 3,731,963 | 5/1973 | Pond | 70/241 |

Primary Examiner—Alvin H. Waring
Attorney, Agent, or Firm—Hume, Clement, Brinks, Willian & Olds, Ltd.

[57] ABSTRACT

An alarm and locking device for deterring theft of removable vehicle rooftops. An alarm is sounded if an unauthorized attempt to remove a rooftop is made, while successful removal of the rooftop is prevented by a locking mechanism.

5 Claims, 5 Drawing Figures

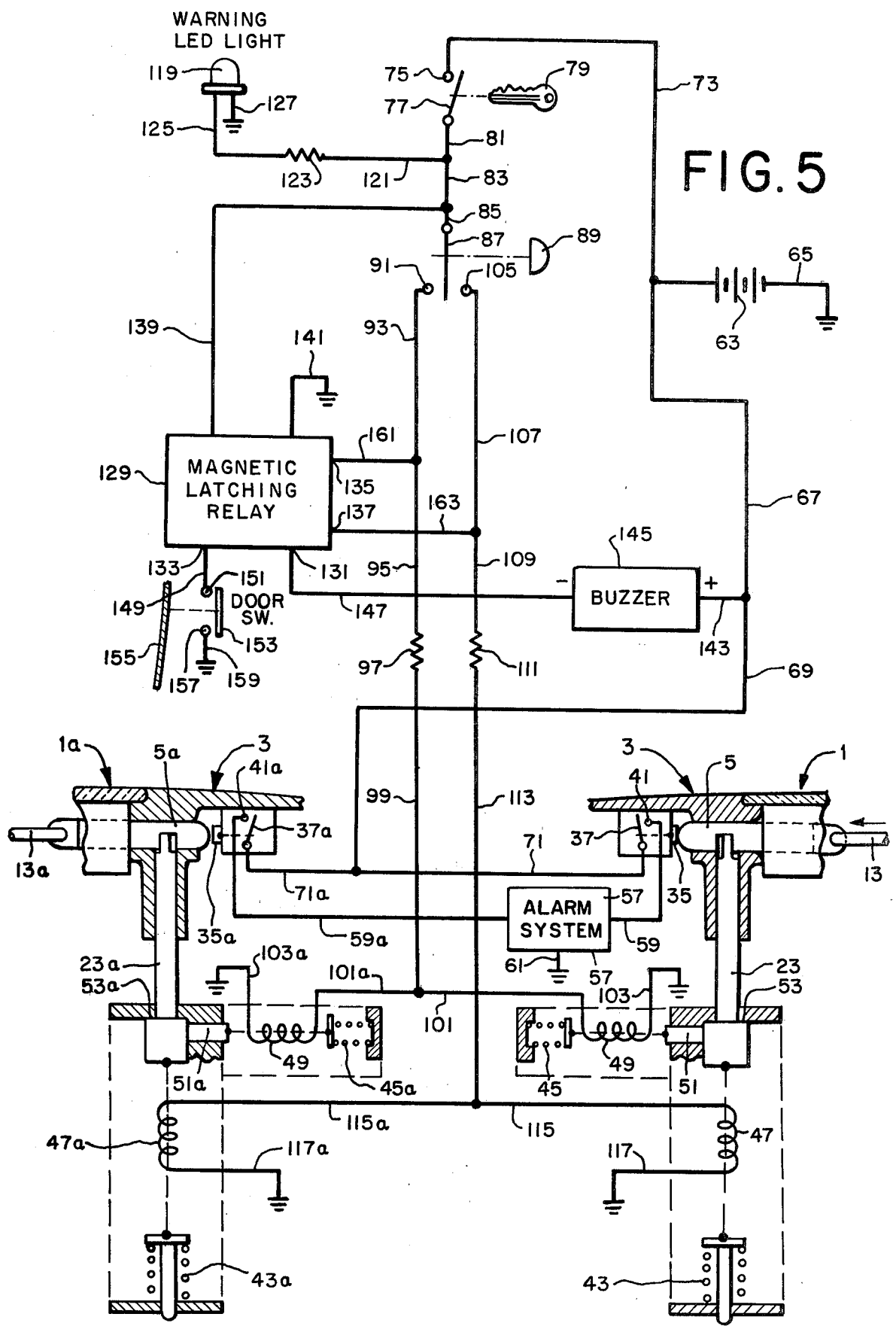

THEFT DETERRING APPARATUS

BACKGROUND OF THE INVENTION

Many automobiles now have hard, removable rooftops. Some may be removed as one piece, while others, designed in what is commonly known as the "T-top" configuration, are removable in two pieces, leaving a fixed bar down the center of the automobile between the back rooftop support and the windshield. The feature common to all such rooftops is the ability to remain securely fastened to the car when properly latched in place, while being quickly and easily removed from the car when desired.

Unfortunately, the same ready removability which makes the rooftop desirable to the automobile owner makes the rooftop an easy target for a thief. Conventional automobile alarm systems are designed to flash lights or sound an alarm when these rooftops are removed, but a competent thief can remove a rooftop and be on his way in 15 to 20 seconds, long before the owner can ordinarily respond to the alarm. The conventional alarm therefore has minimal deterrent effect. The purpose of this invention is to provide a sufficient theft deterrent to render the theft of removable rooftops much more difficult.

BRIEF DESCRIPTION OF THE INVENTION

The present invention operates in an automobile with a removable rooftop. When activated, the apparatus of the invention will detect a small movement of the latching mechanism, as would be made in an attempt to remove the rooftop, and sound an alarm, while simultaneously preventing the latching mechanism from unlatching. When desired, the apparatus may be deactivated and the rooftop removed in the normal manner.

Advantages Of The Invention

It is believed that with the alarm attention to his actions, a normal thief will not care to take the time to determine why the rooftop will not unlatch. Even if he does, the thief will have difficulty overcoming the locking mechanism to accomplish that end. In the most preferred embodiment of the invention, the apparatus must be key operated, further increasing the difficulty of unauthorized operation. In addition, the preferred apparatus of the invention automatically warns the driver of the car if he leaves the car and the apparatus is not in the active mode.

BRIEF DESCRIPTION OF THE DRAWINGS

FIG. 5 is a schematic diagram showing the electrical connections of the various parts of the apparatus.

DESCRIPTION OF THE PREFERRED EMBODIMENT OF THE INVENTION

Figure 1:
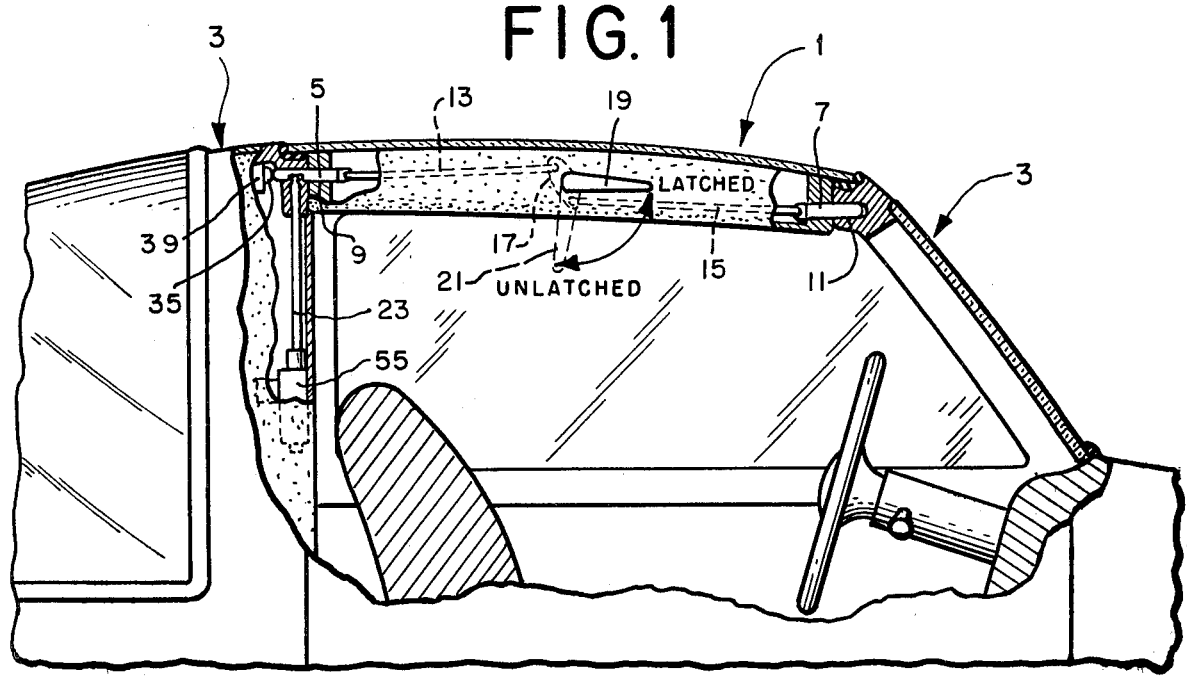
FIG. 1 is a fragmentary elevation view, partly in cross-section, of an automobile showing generally the location of the locking and alarm activating segments of a preferred apparatus embodying the present invention.

Referring now to FIG. 1, a removable rooftop section generally 1 is shown latched in place on an automobile generally 3. The rooftop section 1 is held in the latched position by longitudinally movable shafts 5 and 7 projecting from the rooftop section 1 into openings 9 and 11 formed in the automobile 3. The shafts 5 and 7 are connected by connecting bars 13 and 15 to an oblong plate 17 in such a fashion that if the oblong plate 17 is rotated about an axis, the connecting bars 13 and 15 will cause the shafts 5 and 7 to slide into or project out of the rooftop section 1. A handle 19 is connected to the oblong plate 17 and rotatably mounted in the rooftop section 1 in such a fashion that when the handle 19 is rotated, the plate 17 is also rotated about its axis. To remove the rooftop section 1 from the automobile 3, the handle 19 is moved from the latched position 19 to the unlatched position 21, thereby pulling the shafts 5 and 7 into the rooftop section 1 and out of the openings 9 and 11 in the automobile 3. The rooftop section 1 may then be removed from the automobile 3.

Figure 2:
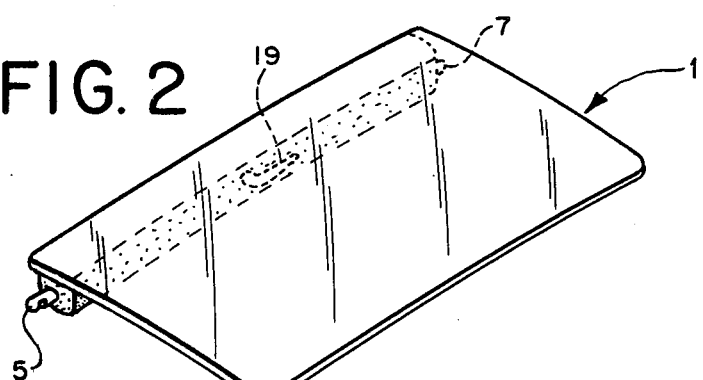
FIG. 2 is a perspective view of one the two sections normally found in the T-top configuration for a removable rooftop.

FIG. 2 shows the rooftop section 1 removed from the automobile 3. For the purpose of illustration the shafts 5 and 7 are shown in the extended or "latched" positions.

Figure 3:
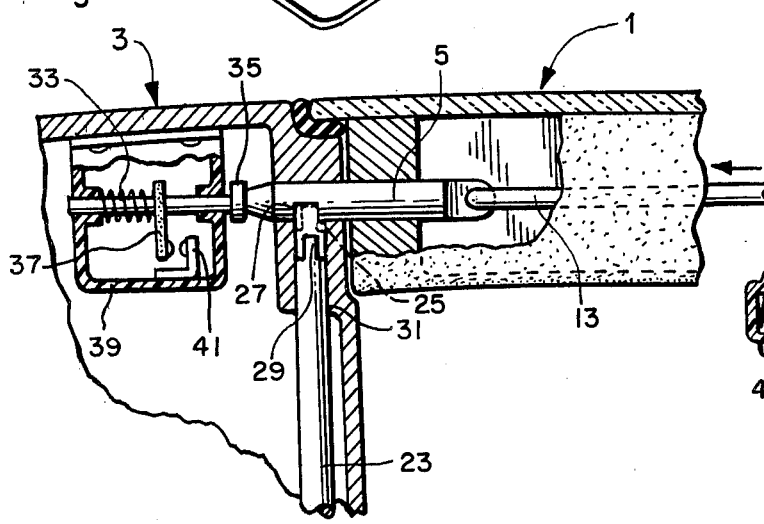
FIG. 3 is a detail cross-sectional view of the locking and alarm activating mechanisms of the preferred apparatus.

Referring now to FIG. 3, the rooftop section 1 is locked in the latched position by a slidably movable locking rod 23. The locking rod 23, when in the locked position 25, projects into a recess 27 formed in the latching shaft 5, thereby preventing the latching shaft 5 from withdrawing into the rooftop section 1. When the rod 23 is moved to the unlocked position 29, it ceases to obstruct movement of the latching shaft 5, which may then be withdrawn into the rooftop section 1, allowing removal of the rooftop section 1. A recess 31 formed in the automobile 3 constrains the locking rod 23 to move in such a fashion as to be properly aligned for insertion into the recess 27 formed in the latching shaft 5.

Turning to the alarm activating mechanism generally, the preferred apparatus has a spring 33 which biases a switch pin 35 towards the latching shaft 5. The latching shaft 5, when in the latched position as shown, presses the switch pin 35 in the opposite direction. An electrical terminal 37 is attached to the switch pin 35. The alarm activating mechanism has a casing 39 to which another electrical terminal 41 is attached. The two electrical terminals 37 and 41 are oriented in such a fashion that they will make contact when the switch pin 35 moves a particular distance in the direction toward the latching shaft 5. The switch pin 35 is normally prevented from moving to the position in which the electrical terminals 37 and 41 make contact by pressure from the latching shaft 5 when that shaft 5 is in the completely latched position as shown. The locking rod 23 and the recess 27 formed in the latching shaft 5 are so dimensioned as to allow the latching shaft 5 to move a longitudinal distance into the rooftop section 1 while remaining locked in the latched position. This distance must be at least as great as the distance the switch pin 35 must move to bring the electrical terminals 37 and 41 into contact, but is limited in total length by the necessity that the latching shaft 5 remain in the latched position.

Figure 4:
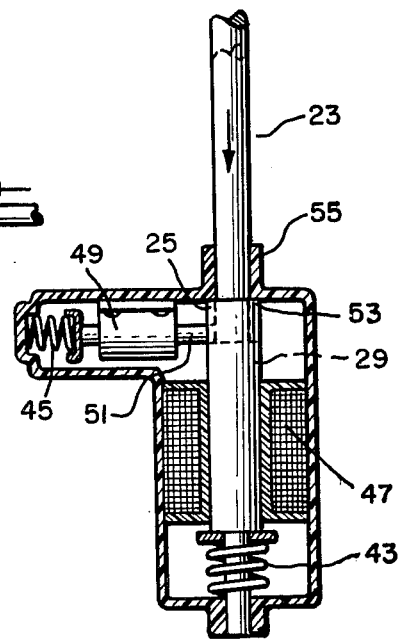
FIG. 4 is a detail cross-sectional view of the preferred embodiment for activating the locking mechanism of the apparatus.

Referring now to FIG. 4, in the preferred apparatus the locking rod 23 is moved into and out of the locked position 25 by means of a combination of springs 43 and 45 and solenoids 47 and 49. The first spring 43 biases the locking rod 23 upwards toward the locked position 25.

The firt solenoid 47, when activated, pulls the locking rod 23 down into the unlocked position 29. The second spring 45 biases a pin 51 in the direction of the locking rod 23. The second solenoid 49, when activated, pulls the pin 51 away from the locking rod 23. When the first solenoid 47 pulls the locking rod 23 down into the unlocked position 29, the second spring 45 causes the pin 51 to project over a shoulder 53 formed in the locking rod 23. When the first solenoid 47 is deactivated, the first spring 43 is unable to move the locking rod 23 back to the locked position 25, because the shoulder 53 formed in the locking rod 23 butts against the pin 51 as shown in phantom lines. The second solenoid 49, when activated, pulls the pin 51 away from the locking rod 23 sufficiently far to clear the shoulder 53 formed in the locking rod 23, thereby allowing the first spring 43 to move the locking rod 23 upwards into the locked position 25. When the second solenoid 49 is deactivated, the second spring 45 will cause the pin 51 to press against the locking rod 23, but as the shoulder 53 formed in the locking rod 23 is now above the pin 51, the pin 51 will no longer significantly interfere with the movement of the locking rod 23. A casing 55 having appropriate openings surrounds the mechanism. The locking rod 23 is kept from escaping from the activating mechanism by the shoulder 53 formed in the rod 23, which butts against the casing 55 of the mechanism when the rod 23 is in the locked position 25. The locking rod 23 will thus remain in the locked 25 or unlocked 29 position after the solenoids 47 and 49 are deactivated.

Referring now to FIG. 5, the circuitry is schematically diagrammed for two sets of locking and alarm apparatus. Two sets would be employed on an automobile with a T-top configuration, having two removable rooftop sections, and would provide an added measure of security for a one-piece rooftop. For convenience, the same numbers have been used to designate corresponding items on the two sides of the automobile, the letter 'a' having been added to one set of the numbers to serve to distinguish between the two sides.

The automobile 3 has installed in it an automobile alarm system 57 of conventional design. The alarm system 57 is connected by conductors 59, 59a to the terminals 41, 41a and by a conductor 61 to ground. Other connections may also be made to the automobile alarm system 57, but are not relevant to the apparatus of the present invention. A power supply, shown here as the positive terminal of an automobile battery 63, is connected to the terminals 37, 37a by conductors 65, 67, 69, 71, 71a.

When the theft deterring apparatus and the automobile alarm system 57 are both activated, an attempt to remove the rooftop section 1 will move the latching shafts 5, 5a sufficiently far into the rooftop sections 1, 1a to allow the switch pins 35, 35a to cause contact between the electrical terminals 37, 37a and 41, 41a. Meanwhile, the locking rods 23, 23a will prevent the latching shafts 5, 5a from actually moving into the unlatched position. With the electrical terminals 37, 37a and 41, 41a in contact, current will flow from the battery 63 by way of the conductors 65, 67, 69, 71, 71a, electrical terminals 37, 37a and 41, 41a, and the conductors 59, 59a to the automobile alarm 57, and by way of the conductor 61 to ground. The automobile alarm system 57 is so constructed that it will signal an alarm if current flows to it from either or both of the conductors 59, 59a.

By the apparatus thus described, an unauthorized attempt to remove either or both the rooftop sections 1, 1a will result in sounding of an alarm, and in a failure to successfully remove the rooftop sections 1, 1a.

Moving now to the electrical connections for operating the locking mechanism of the invention, the battery 63 is connected by conductors 65, 73 to one terminal 75 of a key-operated switch 77 which is operated by a key 79. The other terminal of the key operated switch 77 is connected by conductors 81, 83, 85 to a two-position momentary contact switch 87 manually operable by a toggle 89. One terminal 91 of the two momentary contact switch 87 is connected by conductors 93, 95 to a resistor 97. The resistor 97 is connected to the solenoids 49, 49a by conductors 99, 101, 101a. The other ends of the solenoids 49, 49a are connected to ground by conductors 103, 103a. The resistor 97 may be required to properly regulate the flow of current to the solenoids 49, 49a.

The other terminal 105 of the two-position momentary contact switch 87 is connected by conductors 107, 109 to a resistor 111. The resistor 111 is connected to the solenoids 47, 47a by conductors 113, 115, 115a. The other ends of the solenoids 47, 47a are connected to ground by conductors 117, 117a. The resistor 111 may be required to properly regulate the flow of current to the solenoids 47, 47a.

When the key-operated switch 77 is closed by use of the key 79 and the two-position momentary contact switch 87 is moved to the lock position by use of the toggle 89 current will flow from the battery 63 through the conductors 65, 73, 81, 83, 85, 93, 95 and switches 77, 87 to the resistor 97 and from the resistor 97 through the solenoids 49, 49a and the conductors 99, 101, 101a, 103, 103a to ground. The solenoids 49, 49a will thereby be activated to pull the pins 51, 51a sufficiently far away from the shoulders 53, 53a formed in the locking rods 23, 23a that the pins 51, 51a will cease interfering with the movement of the locking rods 23, 23a. The springs 43, 43a will then be able to move the locking rods 23, 23a upwards into the locked position, as shown.

When the key operated switch 77 is closed and the two-position momentary contact switch 87 is moved to the unlock position, current will flow from the battery 63, through the conductors 65, 73, 81, 83, 85, 107, 109 to the resistor 111, and from the resistor 111 through the solenoids 47, 47a and the conductors 113, 115, 117, 117a to ground. The solenoids 47, 47a will thereby be activated to pull the locking rods 23, 23a down into the unlocked position. The springs 45, 45a will then be able to move the pins 51, 51a towards the locking rods 23, 23a, so that the pins 51, 51a will project over the shoulders 53, 53a formed in the locking rods 23, 23a. When the current through the solenoids 47, 47a is cut off, the springs 43, 43a will then move the locking rods 23, 23a upward until the shoulders 53, 53a butt against the pins 51, 51a. The pins 51, 51a are so positioned that the locking rods 23, 23a will thereby be held in the unlocked position.

By using a momentary contact switch, the solenoids 47, 47a, 49, 49a are activated only long enough to move the locking rods 23, 23a into or out of the locked position. Any unnecessary power drain from the battery 63 is thereby avoided. In any event, the solenoids 47, 47a, 49, 49a will be deactivated if the key operated switch 77 is opened. To ensure that the key operated switch 77 will rarely be left closed, a warning light 119 is preferably connected to the apparatus. The warning light 119 is connected to the key-operated switch 77 by conductors 81, 121, 125 and a resistor 123. The other end of the warning light 119, is connected to ground by a conductor 127. The resistor 123 may be required to properly regulate the flow of current to the warning light 119. When the key-operated switch 77 is closed current will flow from the battery 63 through the conductors 65, 73, 81, 121, 125, the switch 77 and the resistor 123 to the warning light 119, and from the warning light 119 through the conductor 127 to ground. The warning light 119, will thereby be lit, warning the driver that the key operated switch 77 is closed.

In the preferred embodiment, the system also warns the driver if he leaves the automobile and the theft deterring apparatus is not in the locked position. A magnetic latching relay 129 of conventional design is used for this purpose. The magnetic latching relay 129 is so constructed that it will make or break a connection between two of its terminals 131, 133 when the proper signals are detected on two of its other terminals 135, 137 and it is in its active mode. The connection between the terminals 131, 133 will remain connected or broken, as the case may be, after the magnetic latching relay 129 is no longer in its active mode.

The magnetic latching relay 129 is connected by conductors 81, 83, 139 to the key operated switch 77. The magnetic latching relay 129 is also connected by a conductor 141 to ground. The battery 62 is connected by conductors 67, 143 to a buzzer 145. The other end of the buzzer 145 is connected by a conductor 147 to the terminal 131 of the magnetic latching relay 129. The terminal 133 is connected by a conductor 149 to a terminal 151 of a conventional door pin switch 153. The door pin switch 153 will close when an automobile door 155, positioned for normal use by the automobile driver, is opened. The other terminal 157 of the door pin switch 153 is connected by a conductor 159 to ground. The terminal 135 of the magnetic latching relay 129 is connected to the terminal 91 of the two-position momentary contact switch 87 by conductors 93, 161, and terminal 137 to the terminal 105 of the same switch 87 by conductors 107, 163.

When the switch 77 is closed, current will flow from the battery 63 through the conductors 65, 73, 81, 83, 139 and switch 77 to the magnetic latching relay 129 and through the conductor 141 to ground. The magnetic latching relay 129 is so constructed that it will thereby enter its active mode.

If, while the key-operated switch 77 is closed and the magnetic latching relay 129 is therefore in its active mode, the switch 87 is moved to the unlock position, connection will be made between the terminal 137 and the battery 63 by the conductors 65, 73, 81, 83, 85, 107, 163, and switches 77, 87. As there is minimal resistance between the battery 63 and the terminal 137, the terminal 137 will be pulled to a positive potential. A "hi" signal, that is, a positive potential with respect to ground, on the terminal 137 is the signal to the magnetic latching relay 129 to make a connection between the terminals 131, 133. In the situation described, the terminal 137 will be "hi," so the magnetic latching relay 129 will connect the terminals 131, 133.

Similarly, when the two-position momentary contact switch 87 is moved to the lock position, the terminal 135 will be pulled "hi" by the connection through the conductors 65, 73, 81, 83, 85, 93, 161 and switches 77, 87 to the battery 63. When the magnetic latching relay 129 detects such a "hi" signal on the terminal 135, any connection between the terminals 131, 133 will be broken.

The terminals 135, 137 will never both go "hi" at the same time, inasmuch as the two-position momentary contact switch 87 can connect only one of them to the battery 63 at a time, the other being connected only to ground. The magnetic latching relay 129 does nothing if neither of the terminals 135, 137 is "hi".

When the locking rods 23, 23a are moved to the unlocked position, the magnetic latching relay 129 establishes a connection between the conductors 147, 149. If the automobile door 155 is subsequently opened, the door pin switch 153 will close, making contact between its terminals 151, 157. Current will then flow from the battery 63 through the conductors 65, 67, 143, 147 and buzzer 145 to the magnetic latching relay 129 and thence through the conductors 149, 159 and door pin switch 153 to ground. The buzzer 145 will thereby be activated, warning the driver that the theft deterring apparatus is not in the locked position. Conversely, when the locking rods 23, 23a are moved to the locked position, the magnetic latching relay 129 breaks any connection between the conductors 147, 149. When the automobile door 155 is subsequently opened and the door pin switch 153 therefore makes contact between the terminals 151, 157, another gap in the circuit, between the terminals 131, 133 prevents current from flowing through the buzzer 145. The driver hence is not disturbed by the sound of the buzzer 145 when the theft deterring apparatus has been properly activated.

While a particular embodiment of the present invention has been shown and described, it should be understood that various changes and modifications thereto may be made, and it is therefore intended in the following claims to include all such modifications and changes as may fall within the true spirit and scope of this invention.

I claim:

1. In a vehicle having a rooftop removable from a vehicle body, an improved theft deterring apparatus, comprising:
   latching means for retaining the rooftop on the automobile body;
   alarm means for signaling an alarm condition in response to movement of a particular distance of the latching means;
   locking means for selectively locking the latching means in a latched position while allowing movement of the latching means said particular distance, the locking means allowing the latching means to move to the unlatched position when the locking means is in a unlocked position.

2. The theft deterring apparatus of claim 1 wherein the vehicle has a door positioned for normal use by the vehicle operator, and the alarm means further comprises:
   means for detecting when the door is open;
   means for detecting when the locking means is in the unlocked position; and
   means for signaling an alarm condition when the door is open and the locking means is in the unlocked position.

3. The theft deterring apparatus of claim 2 wherein the latching means includes a longitudinally movable shaft having a recess formed therein, and the locking means includes a locking rod movable into and out of said recess, the rod and recess being dimensioned to allow movement of the latching means the particular distance.

4. In a vehicle having a rooftop removable from the vehicle body, an improved theft deterring apparatus, comprising:
- latching means movable to a latched position for fixing said rooftop to said vehicle body, and to an unlatched position to allow removal of said rooftop from the body, the latching means including a longitudinally movable shaft having a recess formed therein;
- locking rod slidably movable into and out of said recess;
- activating means for moving said locking rod into said recess to lock said latching means in the latched position and out of said recess to allow said latching means to move to the unlatched position, the recess and rod being so dimensioned to allow the shaft to move longitudinally when locked in the latched position; and
- alarm means for signaling an alarm condition when the latching means is locked in a latched position and the shaft is moved a longitudinal distance toward the unlatched position.

5. The theft deterring apparatus of claim 4 wherein the vehicle has a door positioned for normal use by the vehicle operator, and the alarm means further comprises:
- means for detecting when the door is open;
- means for detecting when the locking rod is not in the locked position; and
- means for signaling an alarm condition when the door is open and the locking rod is not in the locked position.

* * * * *